(12) United States Patent
Kim

(10) Patent No.: US 6,879,352 B1
(45) Date of Patent: Apr. 12, 2005

(54) CONVERGENCE MEASURING APPARATUS AND METHOD THEREOF

(75) Inventor: Wan-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 872 days.

(21) Appl. No.: 09/714,551

(22) Filed: Nov. 17, 2000

(30) Foreign Application Priority Data

Dec. 9, 1999 (KR) ........................................ 1999-56263

(51) Int. Cl.⁷ .............................................. H04N 9/28
(52) U.S. Cl. ...................... 348/807; 348/177; 348/189; 348/190; 348/806; 359/462
(58) Field of Search ................... 348/175, 177, 348/806, 807, 687, 190, 189, 475, 476, 477, 488, 182; 353/4; 359/462

(56) References Cited

U.S. PATENT DOCUMENTS

| | | | | |
|---|---|---|---|---|
| 2,403,733 A | * | 7/1946 | Mainardi et al. | 396/331 |
| 2,413,996 A | * | 1/1947 | Ramsdell | 396/331 |
| 5,532,765 A | * | 7/1996 | Inoue et al. | 348/807 |
| 5,638,190 A | * | 6/1997 | Geist | 358/500 |
| 5,638,461 A | * | 6/1997 | Fridge | 382/141 |
| 6,018,361 A | * | 1/2000 | Fujii et al. | 348/180 |
| 6,483,313 B1 | * | 11/2002 | Kim et al. | 324/404 |
| 6,552,755 B1 | * | 4/2003 | Kim et al. | 348/807 |

* cited by examiner

*Primary Examiner*—Andrew Christensen
*Assistant Examiner*—Chriss S. Yoder, III
(74) *Attorney, Agent, or Firm*—Burns, Doane, Swecker & Mathis, L.L.P.

(57) ABSTRACT

A convergence measuring apparatus and a measuring method thereof. The apparatus for measuring a convergence includes: a first camera for obtaining the certain pattern formed on the cathode ray tube; a light path dividing section for processing the certain pattern formed on the cathode ray tube into separate left and right stereo images; a second camera for obtaining the stereo images processed by the light path dividing means; an estimating section for estimating the position and posture of the certain pattern based on the stereo images obtained through the second camera; and a controlling section for measuring the convergence of the image obtained by the first camera, while compensating the convergence based on the estimated position and posture of the cathode ray tube. Further, the method for measuring the convergence includes the steps of: forming the certain pattern on the cathode ray tube; calculating the convergence by obtaining the certain pattern formed on the cathode ray tube by the first camera; obtaining the certain pattern formed on the cathode ray tube as a stereo image through the second camera; estimating the position and posture of the cathode ray tube based on the stereo images; and compensating the convergence by including the estimated position and posture of the cathode ray tube in the calculation of the convergence.

5 Claims, 6 Drawing Sheets

CONVERGENCE MEASURING APPARATUS AND METHOD THEREOF

BACKGROUND OF THE INVENTION

1. Field of the Invention

The present invention relates to a convergence measuring apparatus and a method thereof, and more particularly, to a convergence measuring apparatus and a method thereof capable of precisely measuring the convergence while compensating the change of convergence caused due to the change of position and posture of a monitor, through an examining pattern of a predetermined shape formed of a color mixture of red, green, and blue.

2. Description of the Related Art

Generally, for a monitor or a television made of a color cathode ray tube (hereinafter called CRT), various suggestions for examining or adjusting the convergence have been made to prevent color deviation from an image.

FIG. 1 shows one of those suggestions in which photo sensors 5 or cameras (not shown) are adjacently disposed corresponding to a plurality of examining locations on a CRT screen 3 to measure the convergence. According to this suggestion, respective stripes of red, green, and blue (hereinafter called R.G.B. pattern) are shifted forward and backward, or leftward and rightward with respect to the examining locations to measure the light intensity detected by the photo sensors 5. Here, the convergence is measured based on the position of the R.G.B. pattern with respect to the light intensity detected by the photo sensors 5.

While the above suggestion has an advantage in that the convergence can be rapidly measured, it also has a disadvantage of requiring a relatively larger video space in order to secure sufficient movement range of the respective R.G.B. pattern. Accordingly, an offset by an overscan is always included in the measured convergence value, causing an error and incorrect measurement. Further, when an examined object or examining locations change, the positions of the photo sensors 5 also have to be changed in accordance with the respective examining locations, and flexibility deteriorates.

Another suggestion is shown in FIG. 2 in which the positions of the CRT 3 are adjusted appropriately while the convergence is measured by a single camera and a white pattern. According to this suggestion, the position of the CRT 3 is estimated by: obtaining a single image through a measuring camera 7 and a reference pattern of the CRT 3, and comparing the difference between the single image and the reference pattern. More specifically, a boundary line between an injection material covering the CRT 3 and the CRT 3 is detected for being compared with the boundary line of a reference image according to the position and posture of a predetermined image. As a result, the difference between the boundary lines is obtained, and the position and posture of the CRT 3 are estimated based thereon.

By the above suggestion, however, the estimation as to the position and posture of the CRT 3 largely depend on the examined object. Accordingly, when there is little change in the position and posture of the examined object, the image difference obtained through the single camera 7 is also decreased, and accordingly, it is difficult to measure the difference.

Further, according to the above-mentioned suggestion, the convergence is measured in a way that rhombuses of whitish color, i.e., the R.G.B. mixture, appear on the respective examining locations of the CRT 3, and are photographed by the detecting camera 7, i.e., color camera. Accordingly, due to the effect of the R.G.B. mixture, it becomes difficult to precisely measure the convergence. Further, the size of the rhombuses hinders exact formation of the rhombic pattern on the extreme ends of the video area of the monitor, and accordingly, it is difficult to precisely measure the locally varying convergence through the rhombuses.

Another suggestion to measure the convergence includes the processes of: detecting the convergence in a cross-hatch method by a single camera, while simultaneously obtaining a stereo image by an additional color camera: and estimating the CRT position and posture for compensation thereof. Here, the convergence is measured in a manner that the cross-hatch pattern of a whitish color, which is the mixture of R.G.B., appears on the CRT 3, and the image is photographed by the color camera for analysis thereof. Then, the changes of the CRT position and posture are measured through the stereo image of the CRT 3. This suggestion has an advantage in that a relatively precise measurement can be achieved since the changes of the CRT position and posture can be obtained by a considerably large value. Further, since there is no need for a reference examined object, this suggestion also has the advantage of high flexibility.

The above suggestion, however, still has a disadvantage in that the exact measurement is hindered by the effect of the color mixture, since the same uses the white color which is the R.G.B. mixture. Further, since the convergence is measured from locations spaced from the intersections of the cross-hatch pattern at predetermined distances, errors occur according to the respective locations. It is also quite difficult to measure the dynamic convergence at the respective corner areas of the CRT 3.

Accordingly, a new suggestion of measuring the convergence capable of preventing the effect of the color mixture has been suggested. This suggestion includes a monochrome detecting camera, and a pair of monochrome cameras arranged beside the monochrome detecting camera in a symmetrical manner. This suggestion includes the processes of: obtaining a stereo image by additionally provided pair of monochrome cameras while photographing a circular pattern which consists of the respective colors of R.G.B.; and estimating the change of position and posture of the monitor for compensation thereof. Since the convergence is measured in a manner that the monochrome cameras photograph the circular pattern consisting of the respective colors of R.G.B. for analysis and compensation, there is little effect of color mixture. Accordingly, a precise measurement can be achieved.

The above suggestion, however, has a disadvantage of having an incorrect arrangement of the pattern at the respective corners, which is caused due to a deteriorated spatial resolution when the circular patterns consisting of the respective colors of R.G.B. are produced on the CRT 3. Accordingly, the dynamic convergence is harder to measure. Further, since the pattern consisting of the respective colors of R.G.B. is produced by using electric guns for the respective colors of R.G.B., the characteristics of the CRT are not considered. Meanwhile, in order to adjust the CRT position and posture, there are two cameras used, causing another process for precisely calculating the characteristics of the respective cameras for application.

Various suggestions are described as above for measuring the convergence, which have advantages and disadvantages, respectively. As described, it is true that those suggestions hardly measure the dynamic convergence precisely while utilizing the patterns of color mixture based on the optical characteristics of the CRT. Accordingly, studies are in the progress to overcome the shortcomings of the above suggestions, and also to measure the convergence more precisely by compensating the effect by the convergence caused due to the CRT position and posture change, and by increasing the available difference of the CRT position and posture as possible.

SUMMARY OF THE INVENTION

Accordingly, it is an object of the present invention to provide a convergence measuring apparatus and method thereof capable of utilizing a mixture of color patterns based on optical characteristics of a cathode ray tube (CRT), and precisely measuring the dynamic convergence, and also capable of precisely and rapidly compensating the effect to the convergence due to the changes of the CRT posture and position.

The above object is accomplished by an apparatus for measuring a convergence based on a certain pattern formed on a cathode ray tube according to the present invention, including: a first camera for obtaining the certain pattern formed on the cathode ray tube; a light path dividing section for processing the certain pattern formed on the cathode ray tube into separate left and right stereo images; a second camera for obtaining the stereo images processed by the light path dividing section; a section for estimating the position and posture of the certain pattern based on the stereo images obtained through the second camera; and a controlling section for measuring the convergence of the image obtained by the first camera, while compensating the convergence based on the estimated position and posture of the cathode ray tube.

Here, the light path dividing section includes: a triangular reflector formed on the front surface of the cathode ray tube opposite to each other at a predetermined distance; and a pair of plane reflectors arranged opposite to each other while having the triangular reflector therebetween, for reflecting the certain pattern formed by the cathode ray tube toward the triangular reflector; and the second camera obtains the images reflected from both sides of the triangular reflector, respectively.

Further, the convergence measuring apparatus according to the present invention includes a pattern generator for generating certain patterns consisting of a red and blue mixture, and green and blue mixture on the cathode ray tube, and the first camera sequentially obtains the certain patterns respectively consisting of the red and blue mixture, and green and blue mixture, respectively.

Further, the convergence measuring apparatus according to the present invention includes a brightness adjusting section for adjusting the brightness level of the pattern generator by comparing the brightness of the certain pattern obtained through the first camera with respect to the desired brightness.

Meanwhile, the above object is also accomplished by a convergence measuring method according to the present invention, including the steps of: forming the certain pattern on the cathode ray tube; calculating the convergence by obtaining the certain pattern formed on the cathode ray tube by the first camera; obtaining the certain pattern formed on the cathode ray tube as a stereo image through the second camera; estimating the position and posture of the cathode ray tube based on the stereo image; and compensating the convergence by including the estimated position and posture of the cathode ray tube in the calculation of the convergence.

Here, it is preferable that the step of forming the certain pattern on the cathode ray tube sequentially generating the certain pattern consisting of a red and blue color mixture, and a green and blue color mixture, respectively.

It is further preferable that the step of forming the certain pattern on the cathode ray tube further comprises the sub-step of adjusting the brightness of the pattern generator according to the result obtained after comparing the brightness of the certain pattern obtained through the first camera with respect to the desired brightness.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENTS

Figure 1:
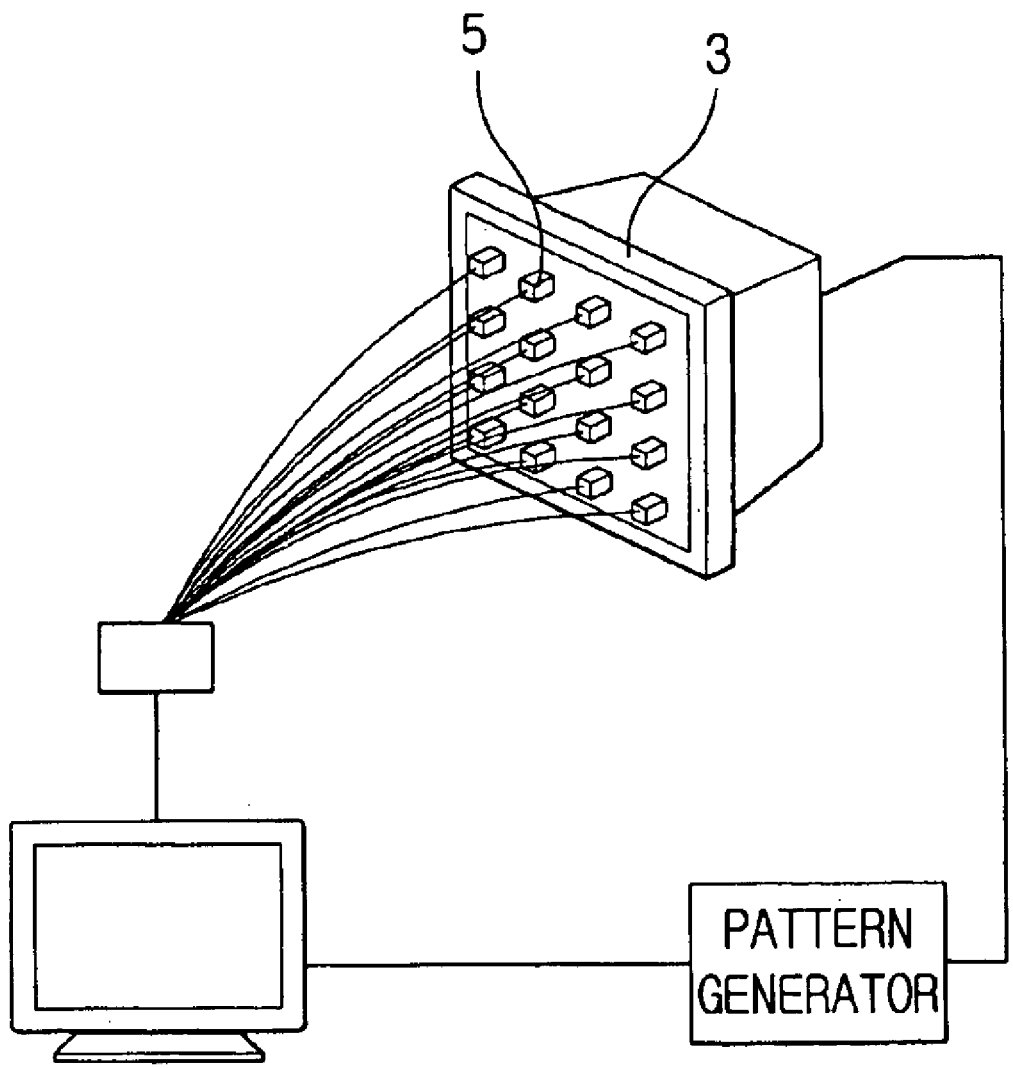
FIGS. 1 and 2 are schematic views of conventional convergence measuring apparatuses.
Figure 2:
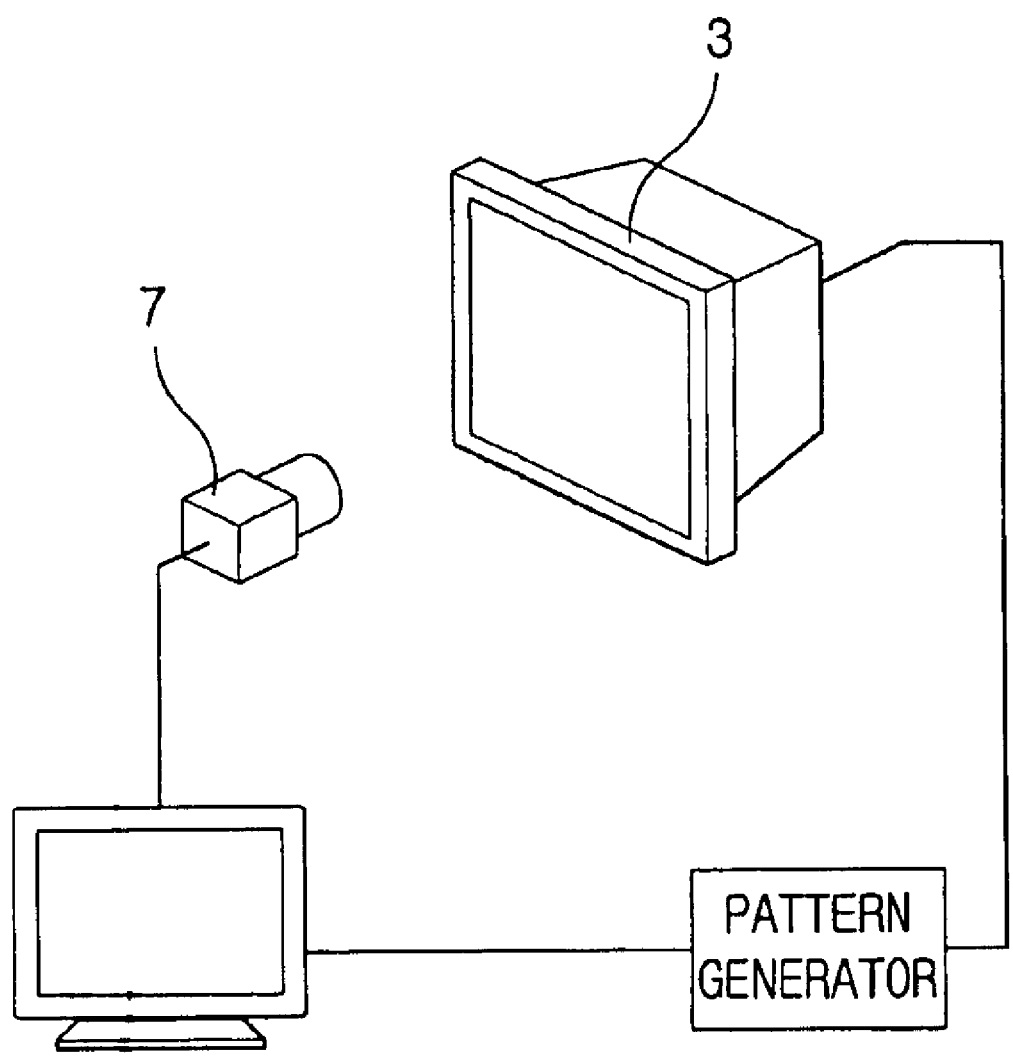

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
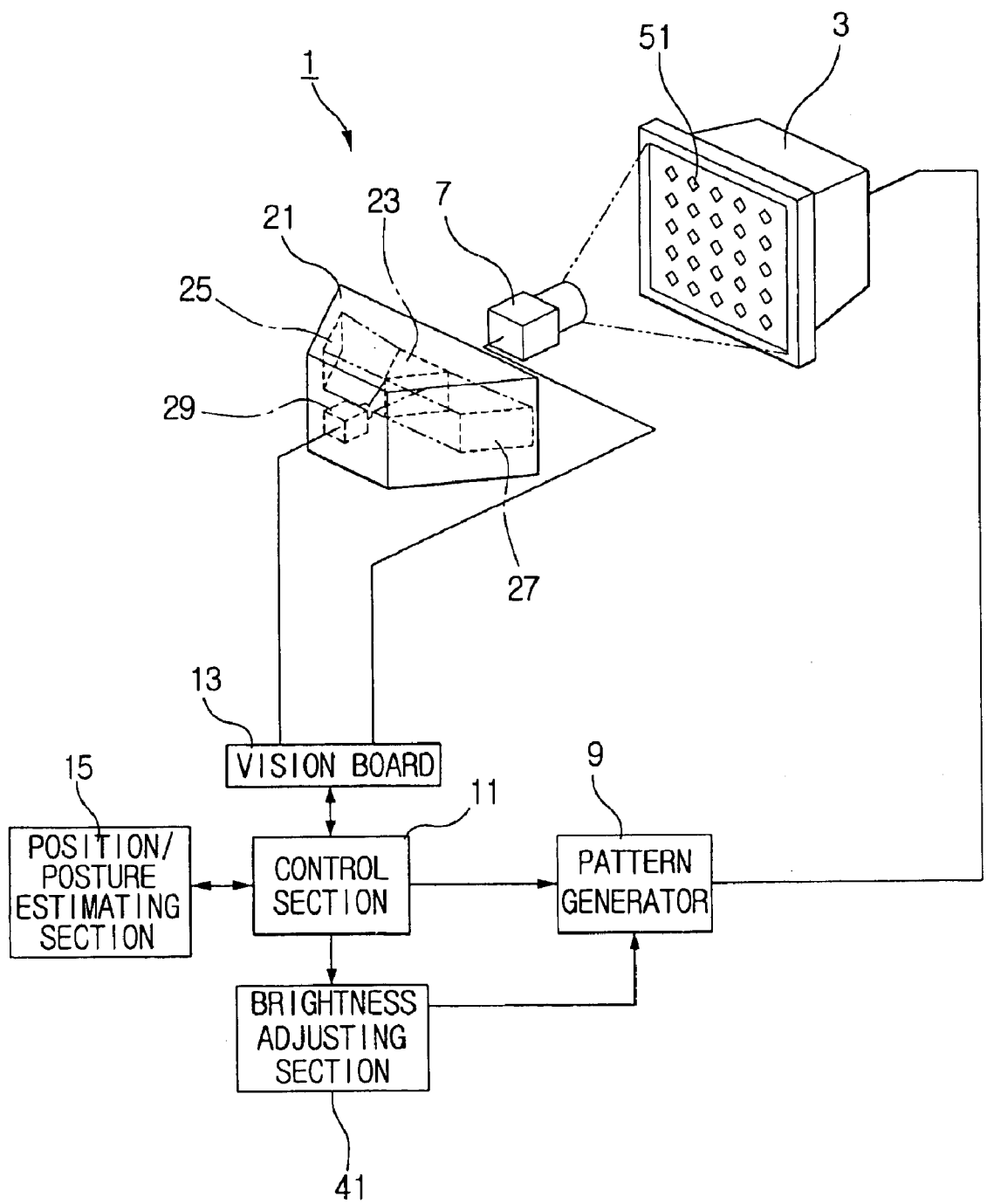
FIG. 3 is a view of a convergence measuring apparatus according to the present invention.
Figure 4:
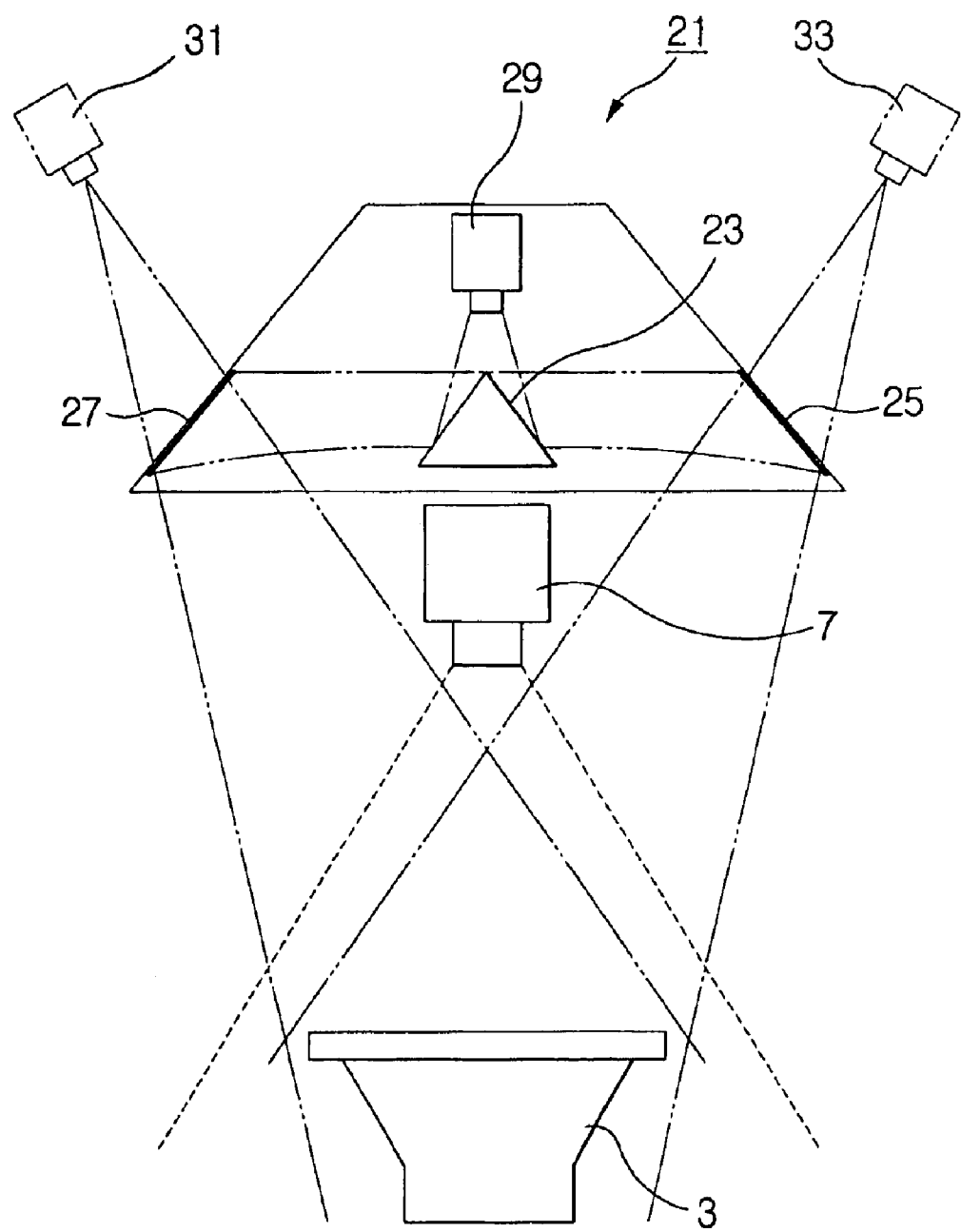
FIG. 4 is a partially enlarged view of FIG. 3, for schematically showing a light path dividing unit.

FIGS. 3 and 4 are views of the convergence measuring apparatus according to the present invention. As shown in FIGS. 3 and 4, an apparatus 1 for measuring the convergence of a certain pattern 51 formed on a cathode ray tube 3 (hereinafter referred to as CRT) includes a pattern generator 9, a light path dividing unit 21 for obtaining a stereo image, first and second cameras 7 and 29; and a control section 11 for calculating the convergence in accordance with the image obtained through the first and second cameras 7 and 29. The first camera 7 may be a color camera, and is located opposite to the CRT 3. The second camera 29 may be a monochrome camera, and obtains the stereo image which is divided by the light path dividing unit 21.

Further, there are additionally provided a vision board 13 for storing and processing the image photographed by the first and second cameras 7 and 29, a position/posture estimating section 15 for estimating the CRT position and posture based on the stereo image obtained by the second camera 29, and a brightness adjusting section 41 for adjusting the brightness of the certain pattern 51.

The pattern generator 9 forms the certain pattern 51 on the CRT 3 in accordance with the control signal from the control section 11. The certain pattern 51 may have various color mixtures and shapes based on the color separation characteristics of the first camera 7 and the noise characteristics of the CRT 3 for the most precise measurement, such as a rhombic pattern of a certain color made of Red, Green, and Blue (hereinafter called R.G.B.). Such a certain pattern 51 may be formed on certain locations of the CRT 3, and as described in a later part of this description, the brightness thereof is adjustable.

Meanwhile, as shown in FIG. 4, the light path dividing unit 21 includes a triangular reflectors 23 located opposite to the CRT 3 at a certain distance, and a pair of plane reflectors 25 and 27 located opposite to each other. The certain pattern 51, which is formed on the CRT 3 and incident on imaginary cameras 31 and 33, is reflected by the plane reflectors 25 and 27 and incident on the neighboring reflection surfaces of the triangular reflector 23. The image reflected from the reflection surfaces of the triangular reflector 23 are incident on the second camera 29. In such a situation, the second camera 29 obtains the stereo image from both reflection surfaces of the triangular reflector 23. As a result, the stereo image obtained by the two imaginary cameras 31 and 33 is the same as that obtained by the second camera 29.

Figure 5A:
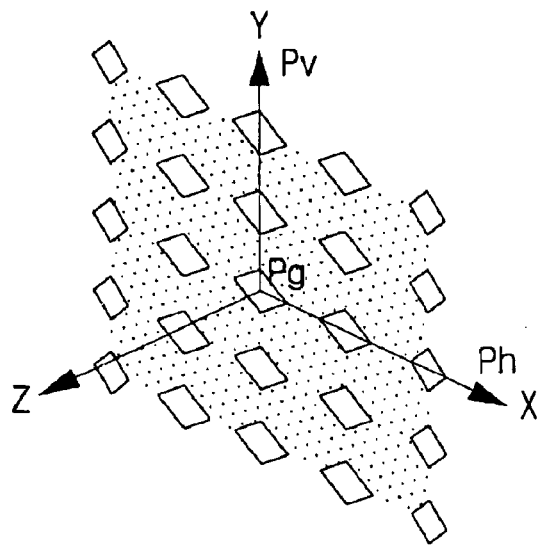
FIGS. 5A and 5B are views for showing a stereo image obtained by dividing a certain pattern formed on the cathode ray tube of FIG. 3 by an optical path dividing unit.
Figure 5B:
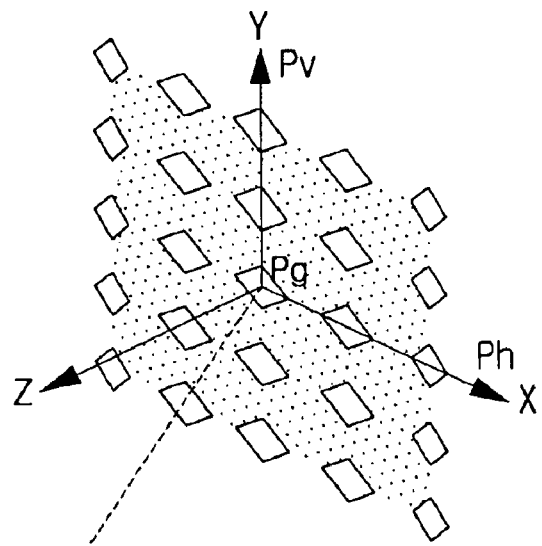

FIGS. 5A and 5B show the stereo image divided by the light path dividing unit 21. The stereo image will be described in greater detail when describing the convergence measuring method.

Figure 6:
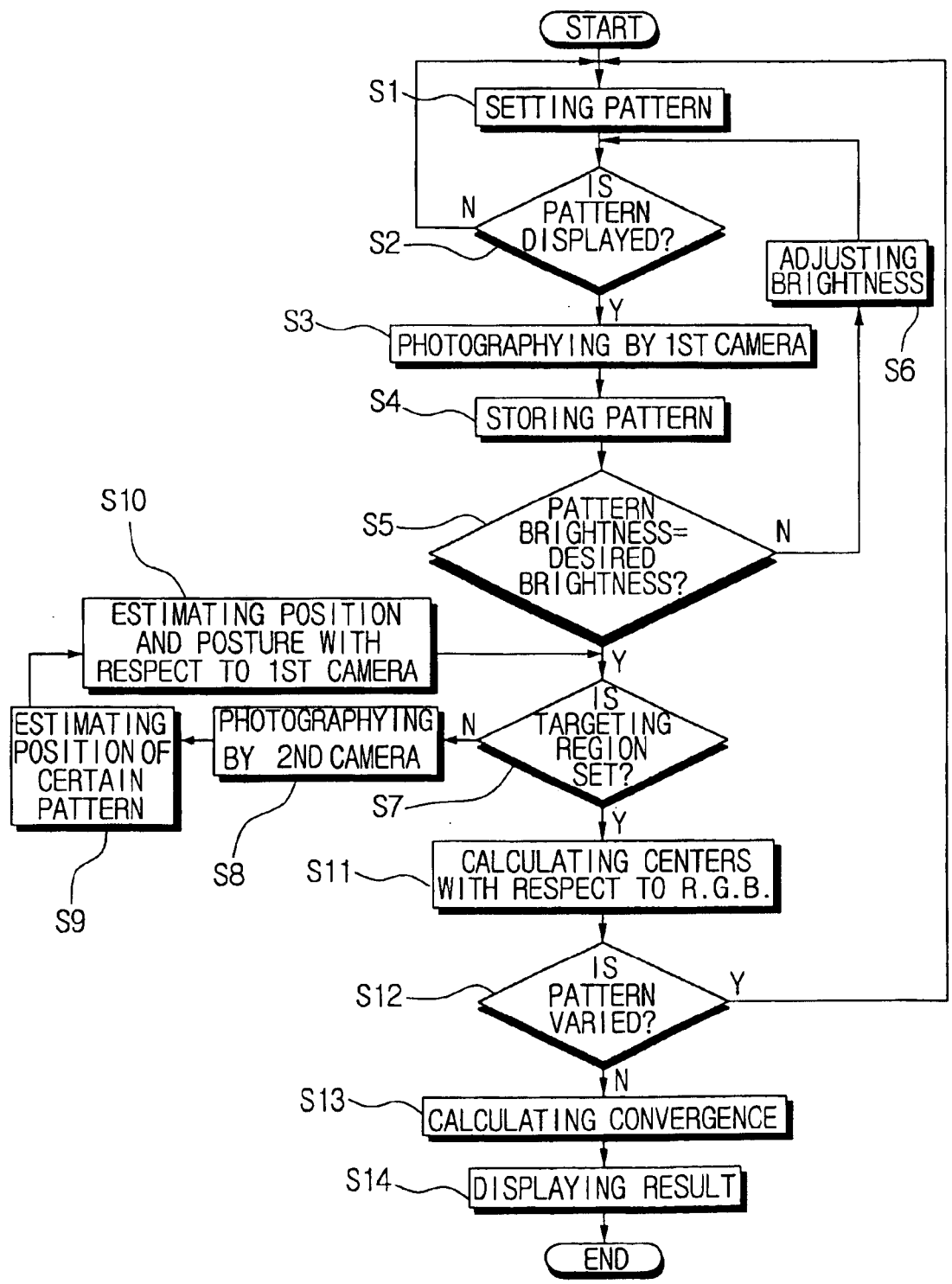
FIG. 6 is a flowchart for explaining a convergence measuring method according to the present invention.

FIG. 6 is a flow chart for explaining the convergence measuring method according to the present invention. As shown in FIG. 6, when a certain pattern is set by using an operating section (not shown) (step S1), the pattern generator 9 inputs the electric signal corresponding to the signal from the control section 11 to the CRT 3. Then, electrons are emitted from the respective electric guns for R.G.B. arranged in back of the CRT 3, and strike on the image surface on the front portion of the CRT 3 which is vapor-deposited with a fluorescent material. Accordingly, the certain pattern 51 is indicated on the CRT 3 (step S2).

Then, the first camera 7 photographs the image of this certain pattern 51. In such a situation, the analogue image is inputted to the vision board 13 to be digitized, and stored in R.G.B. memories (not shown) (step S4). Here, in the R.G.B. memories of the control section 11, the images of the certain pattern 51 are divided into R.G.B., respectively, before being stored.

Such an initially photographed image, however, yet has an unbalanced brightness due to a CRT curvature, lens deformation, and the different positions. Accordingly, the centers of the initially stored R.G.B. in the memories have different light intensities according to the color mixture degree. In order to prevent such an unbalanced brightness, the brightness of the video signal of the certain pattern 51 has to be adjusted in accordance with a certain reference brightness.

Accordingly, after calculating the brightness of the pattern 51 at a certain location stored in the memory, the control section 11 compares the calculated pattern brightness with the desired brightness (step S5). Next, the brightness adjusting section 41 adjusts the brightness of the certain pattern 51 according to the difference between the calculated pattern brightness and the desired brightness (Step S6), then sends out a command to the pattern generator 9, and generates the pattern at the CRT 3 at the adjusted brightness. These processes are repeated until the errors between the calculated pattern brightness and the desired brightness are minimized, and the brightness of the certain pattern 51 on the CRT 3 is sufficiently converted to minimize the effect of color mixture. After the brightness is adjusted, the pattern 51 on the CRT 3 is photographed by the first camera 7 (step S3), and is divided into the respective colors of R.G.B., and is stored in the R.G.B. memories (step S4).

Then, in order to measure the convergence, a certain target area, i.e., a targeting location and region of the pattern 51 are selected (Step S7). Here, the CRT 3 may be at any position and posture, and accordingly, this may accompany an error in the convergence measurement which is measured based on the data stored in the memory. Accordingly, it is required to estimate the CRT position and posture before setting the targeting area.

After the brightness adjusting process, the second camera 29 photographs the pattern 51 formed on the CRT 3 (Step S8). Here, the image obtained through the second camera 29 is a stereo image which is divided by the light path dividing unit 21. Such a stereo image is identical to the stereo image which is obtained through a pair of monochrome cameras described above in the descriptions of the conventional suggestions, with an exception of the photographing direction and distance. Accordingly, by using the stereo image obtained through the second camera 29, the distance and position of the patterns 51 can be estimated (step S9). That is, after obtaining the patterns 51 for the respective images which correspond to each other, the distance and position of the patterns 51 are obtained through the centers of the corresponding patterns 51 by a generally known method such as Parameter and Stereo Methods.

Meanwhile, the distance and position of the patterns 51 from the images obtained through the second camera 29 are converted into a value relative to the first camera 7. Such a process is performed by a geometrical relation between the pair of conventional cameras and the second camera 29 of the present invention, which will be described below.

First, a reference system on the CRT 3 is required to determine the posture of the CRT 3. Next, for example, a direction vector from point Pg to the point Ph may be set as a X-axis, while the direction vector from the point Pg to the point Pv is set as an Y-axis. Then, a Z-axis is obtained by the Cross-Product of the direction vectors of the X and Y axises. Accordingly, the reference system XYZ of the CRT 3 is defined. While the certain pattern 51 on the CRT 3 is defined as the reference system XYZ, the certain pattern 51 also may be defined as the reference system XgYgZg of the first camera 7.

When the reference system XYZ of the CRT 3, and the reference system XgYgZg of the first camera 7 are defined, the particulars of the CRT position and posture relative to the first camera 7 can be determined based on the relation between the respective reference systems XYZ and XgYgZg as follows:

$$P_{cg} = T_{crt}{}^{cg} P_{crt} \qquad \text{[Formula 1]}$$

where, the $P_{crt}$ is a position vector of the certain pattern 51 defined by the first camera 7, and $P_{cg}$ is the position vector of the certain pattern 51 defined by the second camera 29. Further, is a homogeneous transformation matrix for indicating the travel distance and rotational relation between the two reference systems.

Meanwhile, after determining the particulars of the CRT position and posture by the above-described processes (step S10), a certain targeting region is selected for measuring the convergence (step S7). For this purpose, the position of the pattern 51 with respect to the memory, and the size of the pattern 51 at the certain position of the memory must be obtained. Here, the respective colors of R.G.B., which are divided after the brightness adjustment thereof, and stored in the memories, are used as the information. That is, the position of the pattern 51 on the memory can be simply obtained by an inverse event of the above-mentioned stereo method. Then, the targeting region covering the whole is automatically defined at the same location by obtaining the size of the pattern 51 (step S7).

When the targeting region is defined, then the center of brightness of the respective R.G.B. of the pattern 51 within the targeting region is obtained after moving from the respective R.G.B. memories of the control section 11 to the location where the pattern 51 exists. Next, it is checked whether or not the pattern 51 has changed (step S12). If not, the relative distance thereof is calculated to obtain the convergence (step S13). If so, in the meanwhile, the pattern 51 is re-defined (step S1), and the convergence is measured by going over the above-described processes, sequentially.

In the way described above, the convergence of the whole area can be measured by performing the calculation with respect to the respective patterns 51. When all the convergences are measured, the measurement is displayed (step S14), and the user or control section 11 compensates the convergence based on the convergence measurement on display.

Meanwhile, the above-described embodiment employs the whitish pattern which is the combination of the R.G.B. for the sake of a convenient explanation thereof. Such an employment of the white pattern of the R.G.B. mixture, however, may have a discrepancy between the luminescence of the fluorescent material applied on the front side of the CRT 3 which is hit by the electrons jetted from the image layer, and the light-sensitive color band recognizable by the first camera 7. As a result, the color mixture occurs. For example, when the green fluorescent material is luminescent in the CRT 3, the image photographed by the first camera 7 includes 70% information of the red region in addition to the green region. Accordingly, the colors cascade with each other, making it hard to obtain the center of the pure R.G.B. images produced from the fluorescent material.

In order to prevent the effect of the color mixture, a new skill has been recently developed to generate independent patterns of the respective colors of R.G.B. Such a skill, however, has the shortcoming of a longer measuring time required for obtaining three images, although it can prevent the effect of color mixture.

For such a shortcoming, the convergence measuring apparatus and measuring method according to the present invention further discloses a method for efficiently shortening the measuring time while eliminating the possibility of the color mixture effect. More specifically, according to the present invention, the patterns of the red-blue mixture and green-blue mixture are sequentially generated by using the pattern generator. Here, the image of the R.G.B. color mixture is not used, but the independent images are simultaneously generated at two adjacent separate locations, respectively. Since the same object is accomplished by the two independent images, the measuring time is shortened with the same advantage of color mixture effect prevention.

Meanwhile, according to the subject convergence measuring apparatus and measuring method thereof, the patterns of the red-green mixture, and blue-green mixture may be sequentially generated. Generally, however, there is a noticeable effect due to the red and green mixture on the CRT 3. Accordingly, instead of generating the patterns of the red-green mixture and blue-green mixture, it is rather preferable to sequentially generate both patterns of the red-blue mixture and green-blue mixture.

As described above, according to the convergence measuring apparatus and measuring method according to the present invention, the patterns of the color mixture are utilized considering the optical characteristics of the CRT, and the dynamic convergence can be precisely measured.

Accordingly, the effect of the convergence according to the CRT position and posture is compensated while the convergence is rapidly and precisely measured.

As stated above, the preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. An apparatus for measuring a convergence based on certain patterns formed on a cathode ray tube, comprising:

a pattern generator for generating certain patterns comprising a red and blue mixture, and green and blue mixture, respectively, on the cathode ray tube, a first camera for sequentially obtaining the certain patterns formed on the cathode ray tube;

light path dividing means for processing the certain patterns formed on the cathode ray tube into separate left and right stereo images;

a second camera for obtaining the stereo images processed by the light path dividing means;

means for estimating the position and posture of the certain patterns based on the stereo images obtained through the second camera;

a controlling section for measuring the convergence of the image obtained by the first camera while compensating the convergence based on the estimated position and posture of the cathode ray tube.

2. The apparatus as claimed in claim 1, wherein the light path dividing means comprises:

a triangular reflector formed on the front surface of the cathode ray tube opposite to each other at a predetermined distance; and a pair of plane reflectors arranged opposite to each other while having a triangular reflector therebetween, for reflecting the certain pattern formed by the cathode ray tube toward the triangular reflector, and the second camera obtains the images reflected from the triangular reflector, respectively.

3. The apparatus as claimed in claim 1, further comprising a brightness adjusting section for adjusting the brightness level of the certain pattern patterns, wherein the control section compares the brightness of the certain patterns obtained by the first camera with a desired brightness, and the brightness adjusting section adjusts the brightness of the certain patterns according to the result obtained by the control section after comparing the brightness of the certain patterns with the desired brightness.

4. A convergence measuring method comprising the steps of:

generating on a cathode ray tube certain patterns comprising a red and blue color mixture, and a green and blue color mixture, respectively;

calculating the convergence by obtaining the certain patterns formed on the cathode ray tube by a first camera;

obtaining the certain patterns formed on the cathode ray tube as a stereo image through a second camera;

estimating the position and posture of the cathode ray tube based on the stereo image; and compensating the convergence by including the estimated position and posture of the cathode ray tube in the calculation of the convergence.

5. The method as claimed in claim 4, wherein the step of forming the certain patterns on the cathode ray tube further comprises the sub-step of comparing the brightness of the certain patterns obtained by the first camera with a desired brightness, and adjusting the brightness of the certain patterns according to the result obtained after comparing the brightness of the certain patterns and the desired brightness.

* * * * *